US011243961B2

(12) United States Patent
Liu et al.

(10) Patent No.: US 11,243,961 B2
(45) Date of Patent: Feb. 8, 2022

(54) COMPLEX QUERY OPTIMIZATION

(71) Applicant: International Business Machines Corporation, Armonk, NY (US)

(72) Inventors: Ya Qiong Liu, Beijing (CN); Xue Huang, Beijing (CN); Ping Liu, Beijing (CN); Lei Cui, Beijing (CN); Ying Qi Pan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 16/693,681

(22) Filed: Nov. 25, 2019

(65) Prior Publication Data
US 2021/0157810 A1    May 27, 2021

(51) Int. Cl.
*G06F 16/24*       (2019.01)
*G06F 16/2458*     (2019.01)
*G06F 9/54*        (2006.01)
*G06F 9/30*        (2018.01)
*G06F 16/248*      (2019.01)

(52) U.S. Cl.
CPC ........ *G06F 16/2458* (2019.01); *G06F 9/3005* (2013.01); *G06F 9/547* (2013.01); *G06F 16/248* (2019.01)

(58) Field of Classification Search
CPC ............................ G06F 16/248; G06F 16/2458
See application file for complete search history.

(56) References Cited

U.S. PATENT DOCUMENTS

| | | | | |
|---|---|---|---|---|
| 5,349,644 A | * | 9/1994 | Massey | B63B 43/00 340/12.37 |
| 5,905,988 A | * | 5/1999 | Schwartz | G06F 16/954 |
| 6,134,540 A | | 10/2000 | Carey et al. | |
| 6,477,527 B2 | | 11/2002 | Carey et al. | |
| 7,027,975 B1 | * | 4/2006 | Pazandak | G06F 16/3344 704/9 |
| 7,877,381 B2 | * | 1/2011 | Ewen | G06F 16/24542 707/719 |
| 7,945,562 B2 | * | 5/2011 | Ahmed | G06F 16/24544 707/718 |
| 9,898,393 B2 | * | 2/2018 | Moorthi | G06F 11/368 |
| 9,922,101 B1 | * | 3/2018 | Reiner | G06F 16/256 |
| 10,198,475 B2 | * | 2/2019 | Mindnich | G06F 16/24544 |

(Continued)

OTHER PUBLICATIONS

Venken, "Let the database do the hard work! Better performance in SAP Data Services thanks to full SQL-Pushdown", SAP, Blob, Feb. 13, 2014, 2 pages. https://blogs.sap.com/2014/02/13/let-the-database-do-the-hard-work-better-performance-in-sap-data-services-thanks-to-full-sql-pushdown/.

(Continued)

*Primary Examiner* — Eliyah S. Harper
(74) *Attorney, Agent, or Firm* — Daniel M. Yeates

(57) ABSTRACT

Disclosed is a computer implemented method and related system to improve the efficiency of querying remote databases. The method includes receiving, from a host, a query, wherein the query is configured to retrieve a set of data from a remote database. The method also includes, generating an access plan, the access plan comprising a plurality of nodes wherein each node of the plurality of nodes includes a command. The method further includes determining capabilities of the remote database. The method includes executing the query and returning the set of data to the host.

20 Claims, 8 Drawing Sheets

(56) References Cited

U.S. PATENT DOCUMENTS

| | | | |
|---|---|---|---|
| 2004/0107245 A1* | 6/2004 | Bodnar | H04L 67/04 709/203 |
| 2007/0067274 A1 | 3/2007 | Han et al. | |
| 2007/0067361 A1* | 3/2007 | Bailey | H04L 61/2007 |
| 2009/0055362 A1 | 2/2009 | Huang et al. | |
| 2009/0152391 A1* | 6/2009 | McWhirk | B64B 1/02 244/30 |
| 2009/0265352 A1* | 10/2009 | Holenstein | G06F 16/2336 |
| 2017/0116335 A1* | 4/2017 | Baby | H04L 67/2814 |
| 2018/0365036 A1* | 12/2018 | Toal | G06F 9/30047 |
| 2019/0087460 A1 | 3/2019 | Beavin et al. | |
| 2020/0272667 A1* | 8/2020 | Ding | G06F 16/906 |

OTHER PUBLICATIONS

"Implementation of PushDown in Parquet under Spark SQL", CSDN, Jun. 3, 2017, English Translation, 2 pages. https://blog.csdn.net/tom_8899_li/article/details/60580933.

Gao, "Data Source V2 aggregate push down", The Blog, IBM Developer, Published Oct. 23, 2018, 3 pages. https://developer.ibm.com/blogs/apache-spark-data-source-v2-aggregate-push-down/.

"Implementation of PushDown in Parquet under SparkSQL", CSDN, Jun. 9, 2017, English Translation, 5 pages. https://blog.csdn.net/full_stack_delp/article/details/72972934.

Hagleitner et al., "Query Federation with Apache Hive", Hortonworks, Dec. 20, 2018, 5 pages. https://hortonworks.com/blog/query-federation-with-hive/.

"Parquet Filter Pushdown", Apache Drill, Jan. 10, 2019, 9 pages. https://drill.apache.org/docs/parquet-filter-pushdown/.

"Data Source Configuration Properties", Denodo Platform 7.0, printed Jul. 30, 2019, 5 pages. https://community.denodo.com/docs/html/browse/7.0/vdp/administration/creating_data_sources_and_base_views/data_source_configuration_properties/data_source_configuration_properties.

"Presto Documentation", Presto 0.223 Documentation, printed Jul. 30, 2019, 3 pages. https://prestodb.github.io/docs/current/index.html.

Mell et al., "The NIST Definition of Cloud Computing", Recommendations of the National Institute of Standards and Technology, Sep. 2011, U.S. Department of Commerce, 7 pages.

* cited by examiner

COMPLEX QUERY OPTIMIZATION

BACKGROUND

The present disclosure relates to data retrieval, and, more specifically, to improved efficiency in querying remote databases.

Often times there is a reduction in performance when querying a remote database. The poor performance of the query may be caused by sending sub-optimal parts of the query to the remote database. This may cause excessive or the wrong data being retrieved, performing functions on a less capable machine, and other similar issues.

SUMMARY

Disclosed is a computer implemented method to improve pushdownability analysis. The method includes receiving, from a host, a query, wherein the query is configured to retrieve a set of data from a remote database. The method also includes, generating an access plan, the access plan comprising a plurality of nodes wherein each node of the plurality of nodes includes a command. The method further includes determining capabilities of the remote database. The method includes executing the query and returning the set of data to the host. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
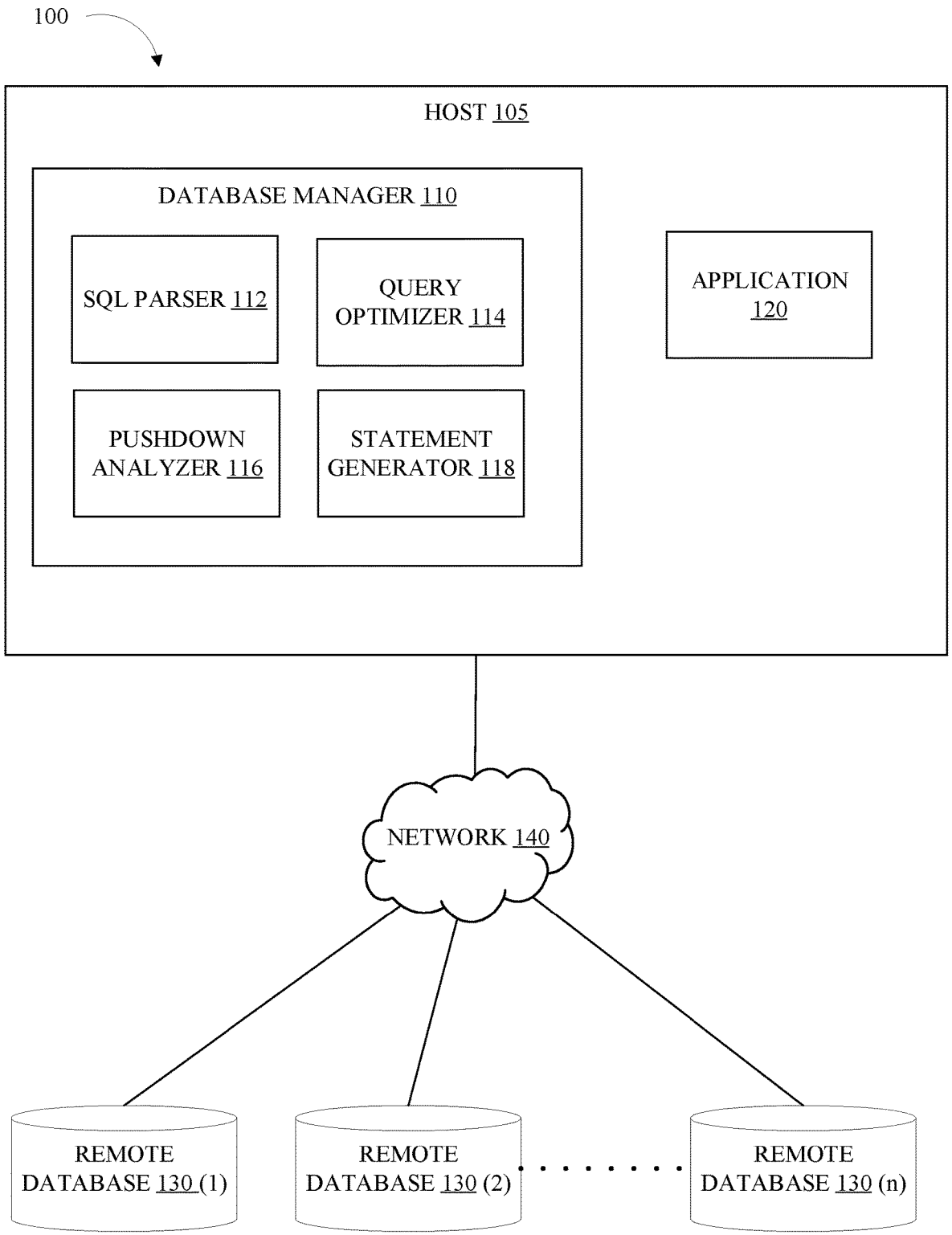
FIG. 1 illustrates a functional diagram of a computing environment suitable for operation of a database manager, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to data retrieval, and, more specifically, to improved methods of pushdownability analysis. Aspects of the present disclosure may be better appreciated in light of the aforementioned applications.

Often times there is a reduction in performance when querying a remote database. The poor performance of the query may be caused by sending sub-optimal parts of the query to the remote database. This may cause excessive or the wrong data being retrieved, performing functions on a less capable machine, and other similar issues. For example, two different remote database systems may have different capabilities based on manufacturer, software, hardware upgrades, settings etc. If a query is set up to work on the first remote database, the query may not be as effective on the second database. The process of determining what parts of a query to send to remote databases is called pushdownability analysis (PDA).

In some embodiments, PDA is a set of rules based on the capabilities of the remote database(s). During PDA, the query is parsed into a set of commands (e.g., sort, join, etc.), and based on a set of pre-determined rules, various commands are executed either locally, or at one or more of the remote databases. In some cases, such as those involving complex queries (e.g., queries that include several tables, queries with union commands, and/or queries with join commands), PDA often fails to return accurate results. The failure may have several causes. Some examples include not having rules for all possibilities of query combinations, hardware and/or software changes at a remote database that changes capabilities leaving the current rules obsolete, and/or human or other error while defining the rules. As a result, for some complex queries, all of the relevant data must be retrieved and then processed locally, rendering the PDA analysis useless and a waste of computing resources.

Embodiments of the present disclosure improve PDA by determining the capability of the remote databases. Aspects of the present disclosure "ask" the remote databases rather than "tell" them how to process the query. This can be an iterative process configured to create efficiency gains for complex queries. The gains may be on the user side, and on the computing side. The users gain efficiency by not having to guess/attempt a complex query without knowing whether the results will be accurate. Additional efficiency gains are achieved by not having to monitor, update, and/or troubleshoot the PDA rules. Computing gains are derived by a reduced number of failed queries, by limiting bandwidth usage (e.g., transferring a full set of data to query locally), and performing each command at a location that is efficient.

Embodiments of the present disclosure improve query performance by the maximum number of commands of a query that may be pushed down to remote servers. In some embodiments, a database management system (DBMS) manages the query. In some embodiments, a query is received from local or a remote source. In some embodiments, the query is in standard query language (SQL). SQL is a programming language designed for managing (storing and/or retrieving) data stored in one or more databases. The query may be parsed by an SQL parser. Parsing is the process of interpreting/translating the input into a form that can be processed by the DBMS.

In some embodiments, parsing and/or optimizing includes generating an access plan (data tree, access tree). The access plan may include one or more nodes, where each node represents a command needed to perform the query. Each node may have one parent node, and/or one or more child nodes. In some embodiments, each branch of the access tree includes a ship command. The ship command may be the first node of a branch that is sent to a remote database. Each child node (e.g., child, grandchild, etc.) of the ship command may be sent to and processed by a remote database (remote server, remote DBMS). All parent nodes to the ship node may be processed locally.

In some embodiments, the DBMS includes an optimizer. The optimizer may determine a plurality of access trees. In some embodiments, the optimizer can determine which of the access trees will be most efficient and/or most correct. In some embodiments, the optimizer can generate and/or adjust the access plan.

In some embodiments, the DBMS determines the capabilities of the remote server. In some embodiments, the capability is determined by sending a create view command. The create view command(s) sends each child node of each ship node to the remote server and receives the results. In some embodiments, the create view command only retrieves a portion of the data that would otherwise be retrieved (e.g., the first two lines of the result only). If a successful execution notification (e.g., SQLCODE=0000) is returned in response to the create view command, then the remote system is capable of performing the command of each node. If an error is returned, then the remote server cannot process each of the commands. The access can be adjusted in response to receiving an error message from the remote database.

In some embodiments, DBMS adjusts the location of the ship commands and resends the create view commands. There may be more or fewer nodes included in the second create view command. In some embodiments, DBMS continues sending additional create view commands in an iterative process until the maximum number of nodes may be pushed down to the remote server.

In some embodiments, the DBMS executes the query. In some embodiments, executing the query is based on the results of the iterative pushdown analysis. Thus, when the query is executed, no errors will be returned, and the correct set of results should be returned. This will eliminate or reduce the need of users to generate multiple queries, and to monitor and/or updated PDA rules based on changes in the capabilities of a remote system.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment 100 that is capable of improving pushdownablility of a query in a distributed database system, in accordance with one or more embodiments of the present disclosure. Many modifications to the depicted environment may be made by those skilled in the art without departing from the scope of the disclosure as recited by the claims.

Computing environment 100 includes host 105, remote database 130(1), remote database 130(2) through remote database 130(n) (collectively referred to as remote databases 130), and network 140. Network 140 can be, for example, a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video information. In general, network 140 may be any combination of connections and protocols that will support communications between host 105, remote databases 130, and other computing devices (not shown) within computing environment 100.

Host 105 can be a standalone computing device, a management server, a web server, a mobile computing device, or any other electronic device or computing system capable of receiving, sending, and processing data. In other embodiments, host 105 can represent a server computing system utilizing multiple computers as a server system, such as in a cloud computing environment. In some embodiments, host 105 represents a computing system utilizing clustered computers and components (e.g., database server computers, application server computers, etc.) that act as a single pool of seamless resources when accessed within computing environment 100. In some embodiments, host 105 includes database manager 110, and application 120.

Database manager 110 can be any combination of hardware and/or software configured to operate a database. The operations may include storing, retrieving, querying, manipulating, monitoring, analyzing, and other similar operations. In some embodiments, database manager 110 is a DBMS. In some embodiments, database manager 110 is part of a federated database system. A federated database system can transparently map multiple autonomous database systems into a single federated database. The databases (e.g., remote databases 130) may be connected to each other by a network (e.g., network 140). In some embodiments, a federated database system acts as a virtual database, where there is no actual data integration in the constituent databases. In some embodiments, database manager 110 includes SQL parser 112, query optimizer 114, pushdown analyzer 116, and statement generator 118.

SQL parser 112 can be any combination of hardware and/or software configured to determine actions to be performed from a query. In some embodiments, SQL parser 112 determines individual commands to complete the query. This may include determining where to send the query and how to divide commands between various locations.

In some embodiments, SQL parser 112 develops one or more access plans. The access plan may include a stack of commands, where each command is considered a node. A node, except for the highest node in the tree (e.g., return command) includes one parent node. A node may have one or more child nodes. In some embodiments, the command node is labeled.

In some embodiments, each branch of the access plan includes a ship node. The ship node (or ship command) indicates that each child node will be pushed down to a remote database. Each ship node includes an identifier (or name, or nickname) of the remote database.

Query optimizer 114 can be any combination of hardware and/or software configured to optimize the query. In some embodiments, optimizing includes altering the one or more previously generated access plans. The altering may include moving (rearranging) nodes in the access plan. In some embodiments, the optimizing includes generating additional access plans.

In some embodiments, query optimizer 114 selects the best access plan. The best plan can be the plan that pushes down the largest number of nodes, and/or the plan that utilizes the least amount of computing resources. In some embodiments, the optimizer can determine the load of the local and/or remote databases. This will allow underutilized databases to be used more so than overutilized systems.

In some embodiments, query optimizer 114 performs post optimization. Post optimization includes adjusting the access plan based on probing the capabilities of the remote databases. In some embodiments, post optimization is performed by pushdown analyzer 116.

Pushdown analyzer 116 can be any combination of hardware and/or software configured to determine which commands can be pushed to remote databases. A pushed command is sent to the remote database to be executed remotely. In some embodiments, pushdown analyzer 116 perform PDA of the query. In some embodiments, pushdown analyzer 116 uses predefined rules to determine which commands may be pushed down. In some embodiments, the rules are a starting point for PDA.

In some embodiments, pushdown analyzer 116 sends create view commands to one of remote databases 130. The create view command is a way to test the capability of remote each of the databases 130. The create view command may issue execute instructions, but only for a portion of the actual queries. For example, a query could search for all entries that include a certain string of characters. The create view command will return a value or an indication that the query was successfully executed. For example, the query may return SQLCODE=00000, which represents success. In some embodiments, the create view returns a predetermined number of results. The number may be a number of rows/results (e.g., two rows).

In some embodiments, pushdown analyzer 116 alters the access plan based on the create view. For example, if the create view command returns an error, this may show one or more of remote databases 130 cannot execute all the commands that were pushed down. Pushdown analyzer 116 may adjust the position of the ship command (e.g., move one or more nodes above the ship command) and resend the create view command. This can continue until it is determined which commands are executable by of or more of remote databases 130. Alternatively, if, after the first create view command, a success code is returned, pushdown analyzer 116 may move one or more nodes as children to the ship command. If an error is returned after adding more nodes to the ship, then the limits of the one or more of remote databases 130 can be determined.

Statement generator 118 can be any combination of hardware and/or software configured to generate execution instructions for commands pushed to the remote database.

Application 120 can be any combination of hardware and/or software that is configured to generate a query. A query can be a request for data and/or information stored in one more tables of or more databases. The databases may be local (e.g., host 105), or remote (e.g., remote databases 130). In some embodiments, application 120 sends the query to database manager 110. In some embodiments, application 120 is included in database manager 110.

In some embodiments, application 120 is part of a computing device separate from host 105. The computing device may communicate with host 105 via network 140. In some embodiments, the computing device can generate queries, send queries to host 105, and/or receive and display the results of the query.

In some embodiments, the query is generated in SQL. In some embodiments, application 120 displays the results of the query. The results may be returned in a SQL format, and/or as images, graphs, trends, and/or other similar formats.

Remote databases 130 can be any combination of hardware and/or software configured to store data in a database system. In some embodiments, each of remote databases 130 are part of a federated database system.

In some embodiments, each of remote databases 130 includes a remote database manager. The remote database manager may be consistent with database manager 120. In some embodiments, the remote database managers may have different capabilities. The differing capabilities may be related to hardware/software versions, manufactures, age, operator policy, physical location, and/or other similar factors. At various times, the capabilities of the remote database manager may change. For example, a remote database system may be able to execute a command that it couldn't prior to a hardware update. This change in capability may have an effect on the PDA for queries being sent to this particular remote server.

Figure 2:
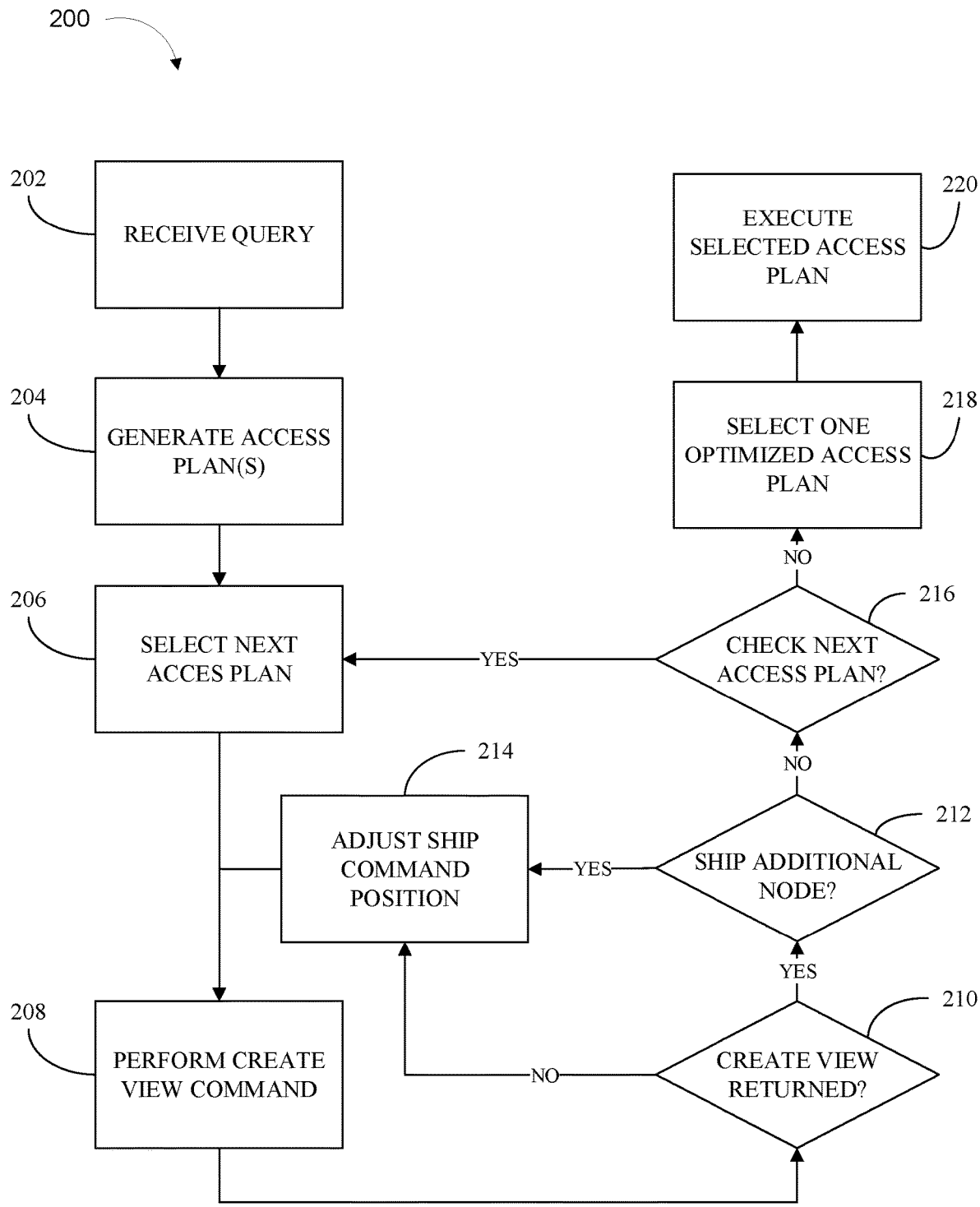
FIG. 2 illustrates a flow chart of an example method to increase node pushdown, in accordance with some embodiments of the present disclosure.

FIG. 2 depicts a flowchart of an example method 200, for complex query optimization that can be performed in a computing environment (e.g., computing environment 100 and/or host 105). One or more of the advantages and improvements described above can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a DBMS (e.g., database manager 110 of FIG. 1), a computing device (e.g., host 105 of FIG. 1), or a different combination of hardware and/or software. In various embodiments, the various operations of method 200 are performed by one or more the components (e.g., host 105, remote database 130(1)), subcomponents (e.g., pushdown analyzer 116, database manager 110), and/or other computing devices in computing environment 100.

At operation 202, database manager 110 receives a query. In some embodiments, the query is received from application 120. In some embodiments, the query is received in SQL. In some embodiments, the query is configured to perform one or more commands on a set of data, wherein the data is stored in one or more remote databases 130.

In some embodiments, operation 202 includes parsing the query. The query may be parsed by SQL parser 112.

At operation 204, database manager 110 generates one or more access plans. An access plan may include which commands should be performed on which data to obtain the desired result. In some embodiments, the access plan includes an access tree (e.g., FIG. 3A). The top node of the access tree may be a return command. The return command returns the processed data to the source of the query. In some embodiments, each branch of the access tree includes a ship command. Each ship command includes an identifier for one of the remote databases 130 that is to be queried.

In some embodiments, operation 204 includes a PDA. In some embodiments, the PDA determines a relative cost of executing the access plan. The relative costs can be determined for each of the one or more access plans.

At operation 206, database manager 110 selects one of the access plans. In some embodiments, the selection is based on the relative computing cost. For example, the plan with lowest cost can be selected. In some embodiments, the selection is random. In some embodiments, the selection is based on the order of access plan generation.

At operation 208, database manager 110 performs the create view command. In some embodiments, a create view command is executed for each of the ship commands in the access plan. The create view command may include each node below (e.g., child, grandchild, etc.) the ship command. In some embodiments, the create view command is performed for each branch of the access plan.

At operation 210, database manager 110 determines if the create view command was returned correctly. In some embodiments, the create view is returned correctly if a success code is returned. In some embodiments, the create view is not returned correctly if an error message is returned. The error message may indicate one or more of remote databases 130 cannot execute at least one of the commands of the create view command. In some embodiments, the create view is returned correctly if a success code is returned. In some embodiments, only a portion of the query data will be returned. This is sufficient to determine the capabilities of the remote system. In some embodiments, operation 210 is executed for each create view command performed in operation 208.

If it is determined the create view was returned correctly, (210: YES) then database manager 110 proceeds to operation 212. If it is determined the create view was not returned correctly, (210: NO) then database manager 110 proceeds to operation 214. In some embodiments, a first branch and a second branch of an access plan may have different results at operation 210. Each will be treated individually. Said another way, various operations of method 200 can be performed for each branch (or each ship command) of an access plan. Each branch can be processed independently of the other branches.

At operation 212, database manager 110 determines if there are additional nodes to be shipped. In some embodiments, determining if there are additional nodes to ship is based on the parent node of the ship command. In some embodiments, if the parent node of the ship command has two child nodes, no additional nodes can be shipped.

If it is determined there are additional nodes to ship, (212: YES) then database manager 110 proceeds to operation 214. If it is determined there are no additional nodes to ship, (212: NO) then database manager 110 proceeds to operation 218.

At operation 214, database manager 110 adjusts a ship command position. In some embodiments, the position is adjusted by modifying the access plan. An adjustment is when the ship node has a different set of child nodes. In some embodiments, the adjustment is made by pushdown analyzer 116. In some embodiments, the adjustment is made by query optimizer 114. Database manager 110 returns to operation 208 in response to adjusting the ship command position.

At operation 216, database manager 110 determines if the next access plan should be checked. In some embodiments, all access plans generated in operation 204 are checked. In some embodiments, the next access plan is checked based on results of the previous operations. For example, if several adjustments to a previous access plan were made, the next one will be checked. In some embodiments, the next access plan is checked based on the result of the PDA. In some embodiments, if any node from any branch is not pushed down, then the next access plan is checked. Alternatively, if all possible nodes are pushed down, there is little or no advantage to checking additional access plans.

If it is determined the next access plan should be checked (216: YES), then database manager 110 returns to operation 206. If it is determined that the next access plan does not need to be checked (216: NO), then database manager 110 proceeds to operation 218.

At operation 218, database manager 110 selects one optimized access plans. In some embodiments, the selection is made from the access plans that were checked/optimized. In some embodiments, an access plan is checked when it is processed through operations 206-216 of method 200. In some embodiments, the selection is based on the number of nodes pushed down. The number of nodes may be the highest percentage of nodes, or the highest absolute number of nodes. In some embodiments, the selection is based on whether the computationally expensive nodes are pushed down.

At operation 220, database manager 110 executes the selected access plan. In some embodiments, the plan is executed by performing the query using the optimized access plan. In some embodiments, operation 220 includes returning the results to the source of the query.

Figure 3A:
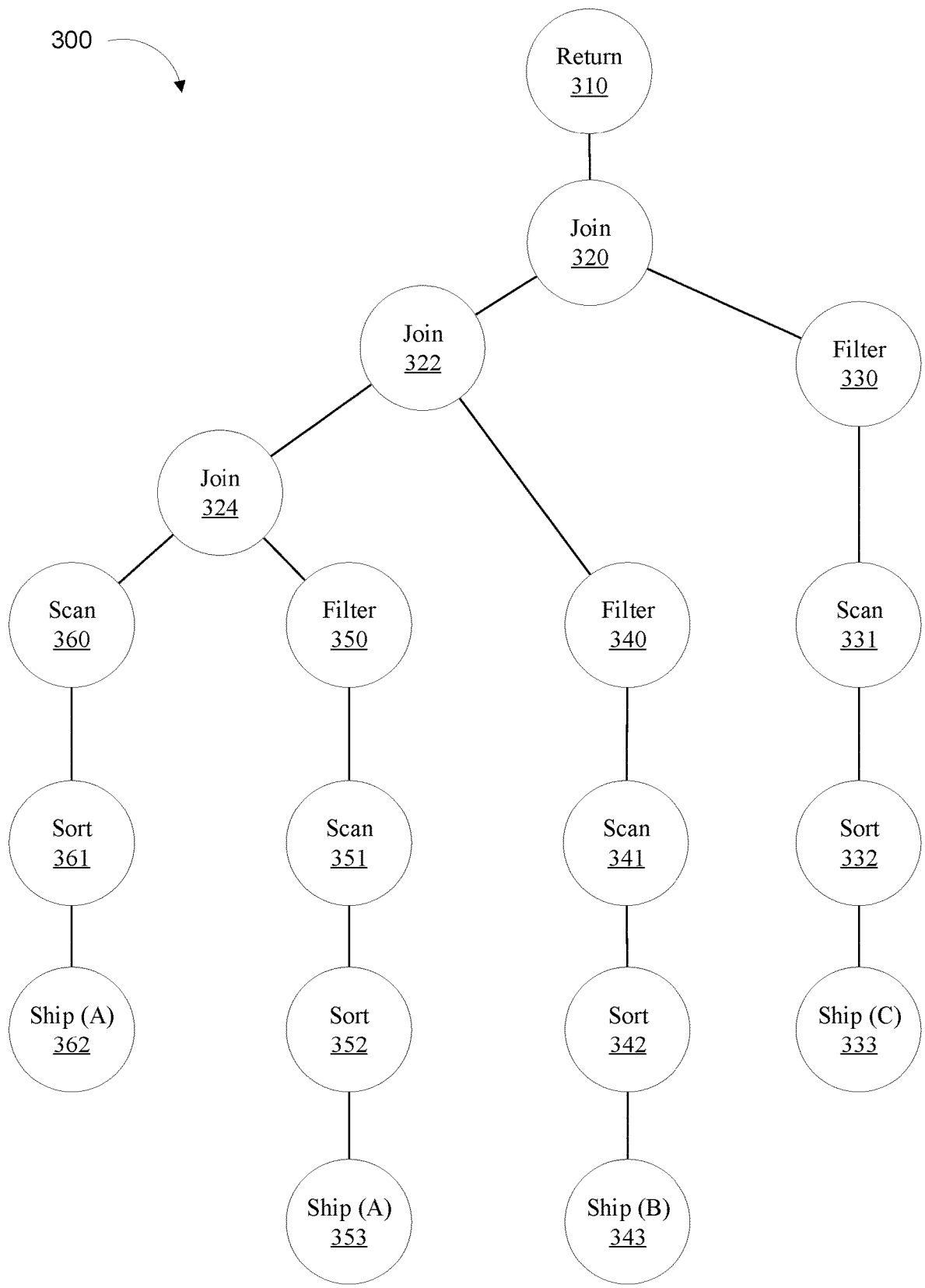
FIG. 3A-3C illustrate example access plans in accordance with various embodiments of the present disclosure.

FIG. 3A represents a visualization of one embodiment of an access plan 300. Each node in the access plan represents a single executable command, and each node has a unique identifier. The commands do not necessarily represent actual commands but are representative of commands that may be used to query a federated database system. The connector between each node represents an order in which to perform certain commands. In some embodiments, FIG. 3A is an access plan generated at operation 204 of method 200. In FIG. 3A, no nodes are pushed down to the remote database.

Access plan 300 includes return node 310. Return node 310 has a child join node 320. Join node 320 is a parent of join node 322, which is a parent of join node 324. Each of join node 320, join node 322, and join node 324 have two child nodes creating four branches in access plan 300. One branch includes filter node 330, scan node 331, sort node 332 and ship (C) node 33, where the (C) is an identifier of a remote database. Another branch includes filter node 340, scan node 341, sort node 342 and ship (B) node 353. A third branch includes filter node 350, scan node 351, sort node 352, and ship (A) node 353. The last branch includes scan node 360, sort node 361, and ship (A) node 362.

Nodes 333, 343, 353, and 362 represent a ship command. The ship command may send each of the child nodes to the ship command to a target database. Each ship command includes a target database in parenthesis. For example, (A) may be remote database 130 (1), (B) may be remote database 130 (2), and (C) may be remote database 130 (n) of FIG. 1.

Figure 3B:
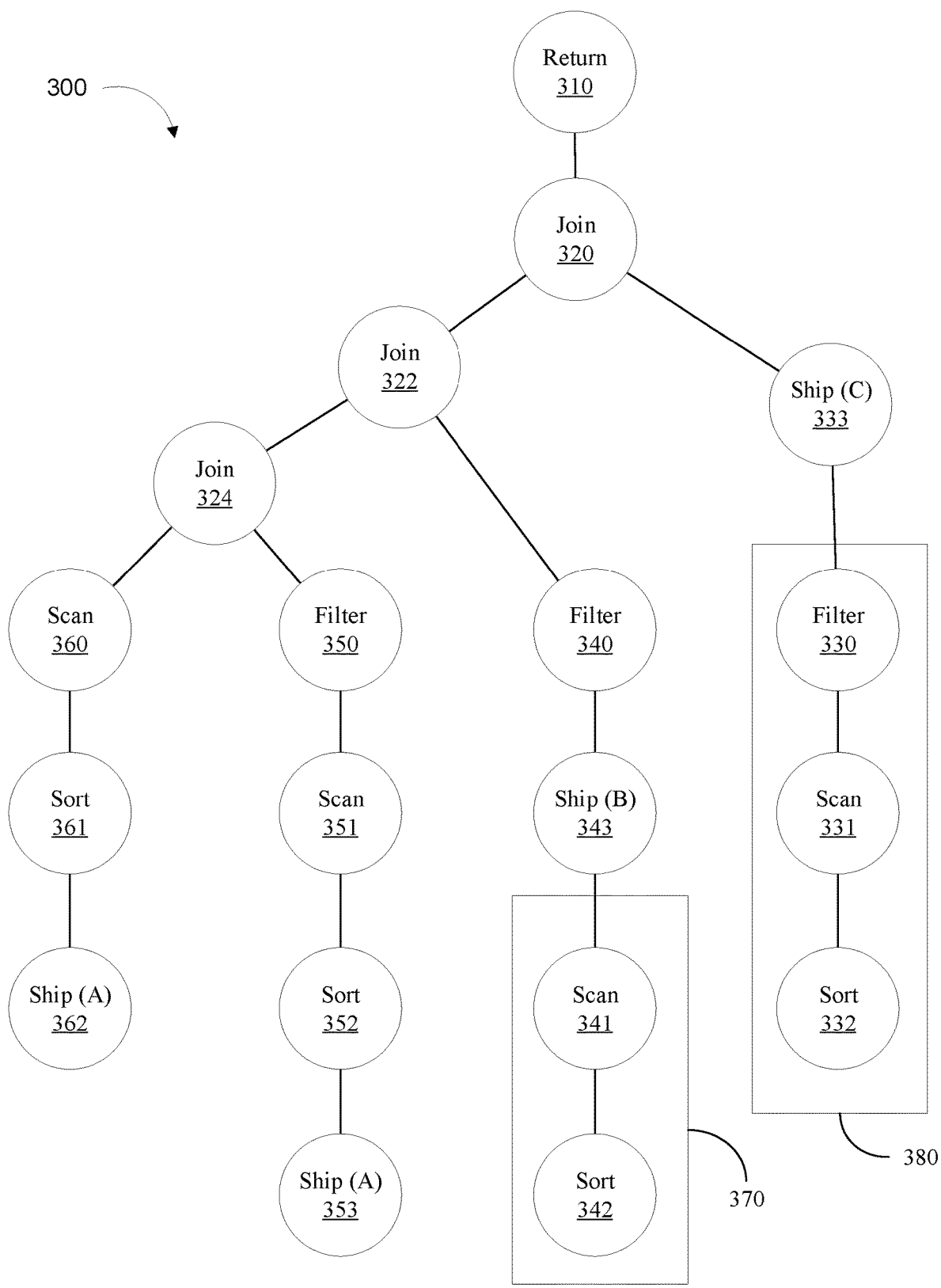

FIG. 3B represents the access plan 300 of FIG. 3A during or after being processed through the method 200. Boxes 370 and 380 represent nodes that have been moved below the ship command (e.g., are now child nodes to ship (C) node 333). In this example, remote database B can perform the scan and sort commands, remote database C can perform filter scan and sort, and remote database A, cannot perform any of the commands above ship (A) command.

Figure 3C:
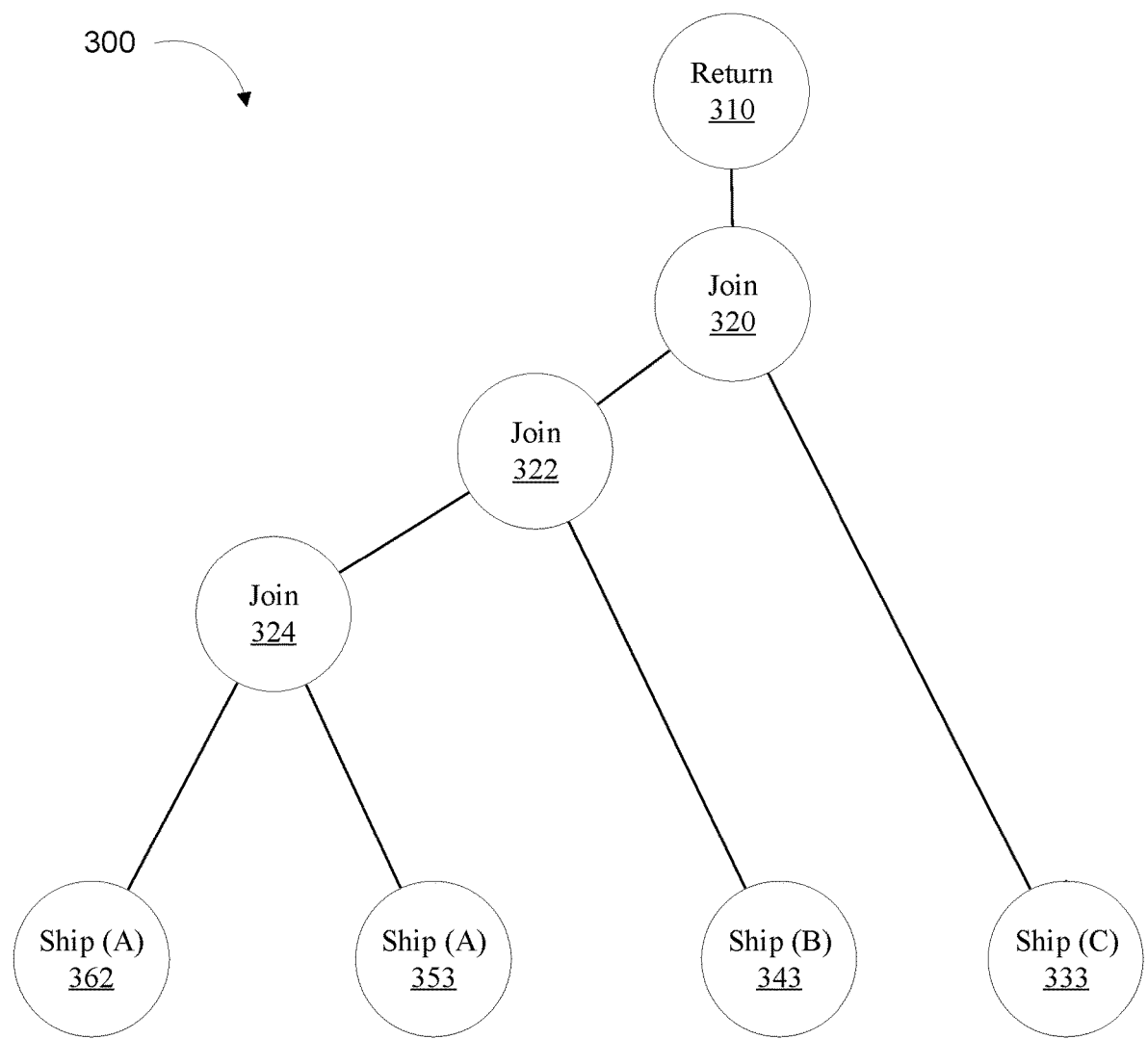

FIG. 3C represents the access plan of FIG. 3A when all of the remote databases can perform all of the commands. This shows all possible commands pushed down.

Figure 4:
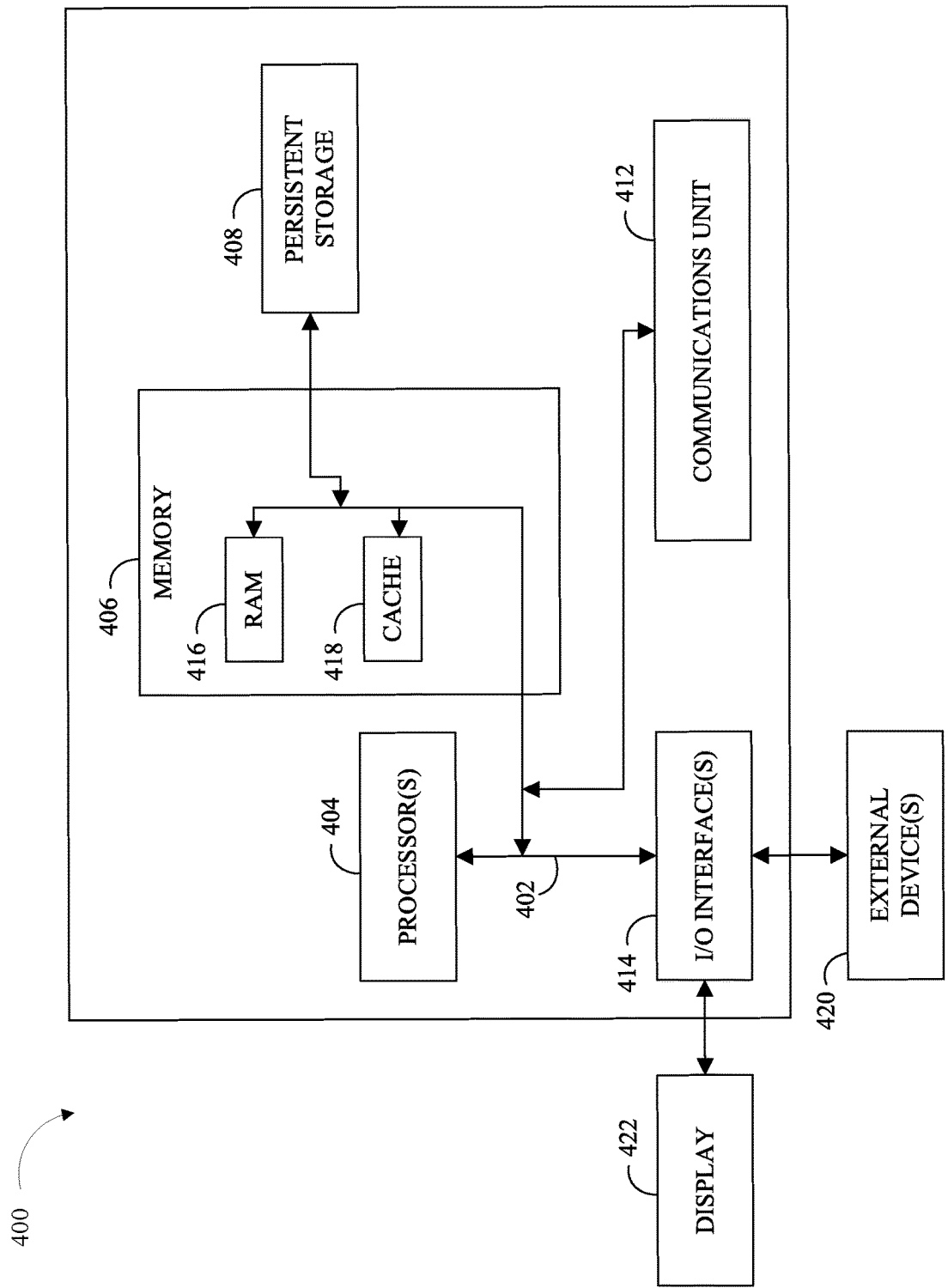
FIG. 4 illustrates a block diagram of an example computer system capable of validating identities of persons participating in an online service.

FIG. 4 is a block diagram depicting components of a computer 400 suitable for database management in accordance with at least one embodiment of the invention. In an embodiment, computer 400 is representative of host 105, and remote databases 130. FIG. 4 displays the computer 400, one or more processor(s) 404 (including one or more computer processors), a communications fabric 402, a memory 406 including a RAM 416 and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions database manager 110 and other components may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal data assistants).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
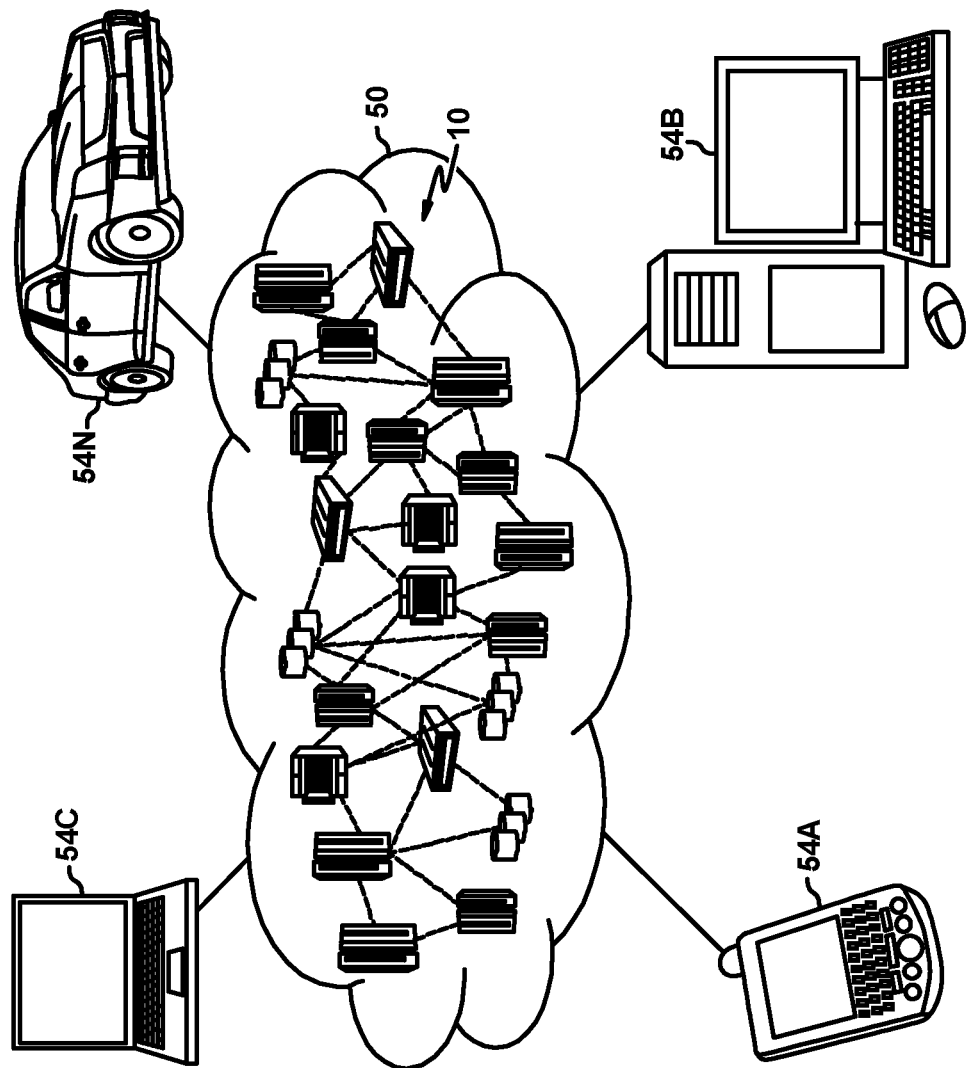
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
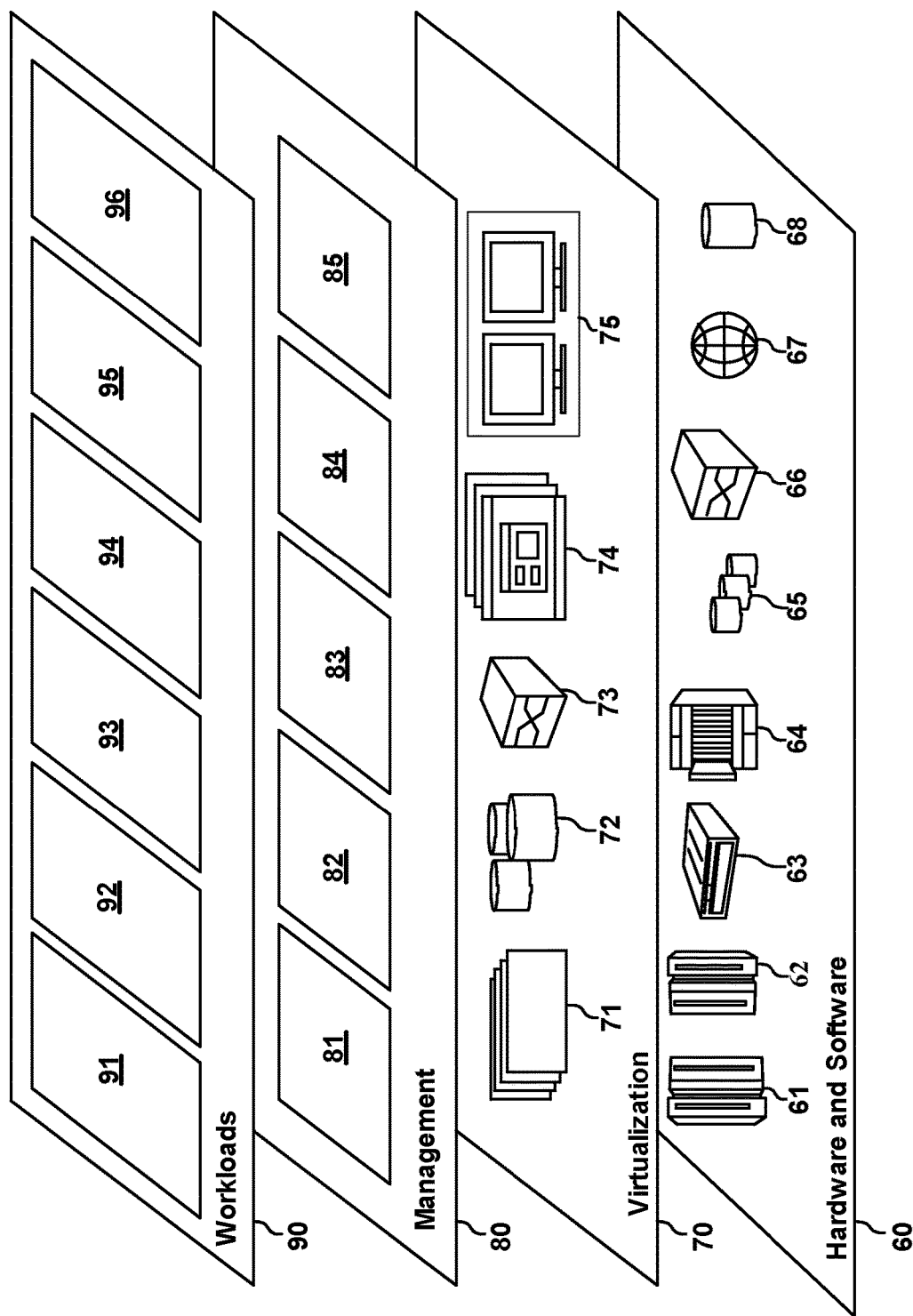
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database management 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, from a host, a query, wherein the query is configured to retrieve a set of data from a remote database;
   generating an access plan, the access plan comprising a plurality of nodes wherein each node of the plurality of nodes includes a command, each command is to be processed iteratively, and at least one node is processed by the remote database;
   determining, based on the access plan, capabilities of the remote database, including that the remote database can process the at least one node;
   executing, in response to determining the capabilities of the remote database and according to the access plan, the query; and
   returning the set of data to the host.

2. The method of claim 1, wherein the access plan includes one or more branches, wherein each branch includes a ship command, and each child node of each ship command is processed by the remote database.

3. The method of claim 2, wherein determining the capabilities of the remote database comprises:
   sending a create view command of the access plan to the remote database;
   receiving, in response to the create view command, a success code for the create view command from the remote database; and
   wherein executing the query is in response to receiving the success code for the create view command.

4. The method of claim 2, wherein the ship command is configured to send each child node of the ship command to an associated remote database.

5. The method of claim 3, wherein the create view command is a first create view command, the method further comprising:
   sending a second create view command to the remote database;
   receiving, in response to the second create view command, an error message; and
   adjusting, in response to the error message, the access plan.

6. The method of claim 5, wherein adjusting the access plan includes moving a child node of the ship command, to be a parent node of the ship command.

7. The method of claim 1, wherein the access plan is a first access plan, the method further comprising:
   generating a second access plan;
   optimizing, the first access plan and the second access plan, wherein optimizing, includes maximizing a set of child nodes of a ship command.

8. The method of claim 7, further comprising:
   selecting the first access plan, and wherein a ship command of the first access plan includes a greater number of child nodes than a ship command of the second access plan.

9. The method of claim 1, wherein the remote database is a first remote database in a plurality of remote databases, and each remote database in part of a federated database system.

10. The method of claim 1 wherein the method is performed by a database manager executing program instructions, and wherein the program instructions are downloaded from a remote data processing system.

11. A system comprising:
   a processor; and
   a computer-readable storage medium communicatively coupled to the processor and storing program instructions which, when executed by the processor, are configured to cause the processor to:
      receive, from a host, a query, wherein the query is configured to retrieve a set of data from a remote database;
      generate an access plan, the access plan comprising a plurality of nodes wherein each node of the plurality of nodes includes a command, each command is to be processed iteratively, and at least one node is processed by the remote database;
      determine, based on the access plan, capabilities of the remote database, including that the remote database can process the at least one node;
      execute, in response to determining the capabilities of the remote database, the query; and
      return the set of data to the host.

12. The system of claim 11, wherein the access plan includes one or more branches, wherein each branch includes a ship command, and each child node of each ship command is processed by the remote database.

13. The system of claim 12, wherein determining the capabilities of the remote database comprises:
   sending a create view command of the access plan to the remote database;
   receiving, in response to the create view command, a success code for the create view command from the remote database; and
   wherein executing the query is in response to receiving the success code for the create view command.

14. The system of claim 12, wherein the ship command is configured to send each child node of the ship command to an associated remote database.

15. The system of claim 13, wherein the create view command is a first create view command, wherein the system is further configured to:
   send a second create view command to the remote database;
   receive, in response to the second create view command, an error message; and
   adjust, in response to the error message, the access plan.

16. A computer program product, the computer program product comprising a computer readable storage medium having program instructions embodied therewith, the program instructions executable by a processing unit to cause the processing unit to:
   receive, from a host, a query, wherein the query is configured to retrieve a set of data from a remote database;
   generate an access plan, the access plan comprising a plurality of nodes wherein each node of the plurality of nodes includes a command, each command is to be processed iteratively, and at least one node is processed by the remote database;
   determine, based on the access plan, capabilities of the remote database, including that the remote database can process the at least one node;
   execute, in response to determining the capabilities of the remote database, the query; and
   return the set of data to the host.

17. The computer program product of claim 16, wherein the access plan includes one or more branches, wherein each branch includes a ship command, and each child node of each ship command is processed by the remote database.

18. The computer program product of claim 17, wherein determining the capabilities of the remote database comprises:
   sending a create view command of the access plan to the remote database;
   receiving, in response to the create view command, a success code for the create view command from the remote database; and
   wherein executing the query is in response to receiving the success code for the create view command.

19. The computer program product of claim 17, wherein the ship command is configured to send each child node of the ship command to an associated remote database.

20. The computer program product of claim 18, wherein the create view command is a first create view command, and the processing unit is further configured to:
   send a second create view command to the remote database;
   receive, in response to the second create view command, an error message; and
   adjust, in response to the error message, the access plan.

* * * * *